(12) United States Patent
Tonegawa

(10) Patent No.: US 6,952,721 B2
(45) Date of Patent: Oct. 4, 2005

(54) COMMUNICATION APPARATUS, CONTROL METHOD, AND STORAGE MEDIUM THAT CAN IDENTIFY COMMUNICATION ERRORS

(75) Inventor: Nobuyuki Tonegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 09/875,856

(22) Filed: Jun. 8, 2001

(65) Prior Publication Data

US 2001/0054076 A1 Dec. 20, 2001

(30) Foreign Application Priority Data

Jun. 9, 2000 (JP) .................................. 2000-173740

(51) Int. Cl.$^7$ .............................................. G06F 15/16
(52) U.S. Cl. ...................................................... 709/206
(58) Field of Search ................................ 709/206, 205; 714/48; 358/1.1

(56) References Cited

U.S. PATENT DOCUMENTS

| | | | | |
|---|---|---|---|---|
| 5,210,869 A | * | 5/1993 | Williams ...................... 714/48 |
| 5,805,810 A | * | 9/1998 | Maxwell ...................... 709/206 |
| 5,970,491 A | * | 10/1999 | Schreiber et al. ............. 707/10 |
| 6,128,101 A | * | 10/2000 | Saito ........................... 358/402 |
| 6,163,809 A | * | 12/2000 | Buckley ....................... 709/237 |
| 6,185,603 B1 | * | 2/2001 | Henderson et al. .......... 709/206 |
| 6,434,601 B1 | * | 8/2002 | Rollins ........................ 709/206 |
| 6,650,440 B1 | * | 11/2003 | Wing ........................... 358/402 |

\* cited by examiner

Primary Examiner—Krisna Lim
(74) Attorney, Agent, or Firm—Fitzpatrick, Cella, Harper & Scinto

(57) ABSTRACT

A communication apparatus capable of notifying a receiver of a reception mail error or transmission mail error by printing or the like and preventing incorrect data or error notification mail from being transferred or stored without notifying the user of the error, and a control method and storage medium therefor. To accomplish this, when analysis of electronic mail data reveals a MIME analysis error, BASE64 decoding error, TIFF analysis error, or image decoding error, i.e., when data which cannot be handled by the communication apparatus is contained, a global variable FORWARD is set to "1". Also, when the received electronic mail is an error notification mail, the variable FORWARD is set to "1". When the variable FORWARD is set to "1", transfer and BOX storage of the received mail are inhibited, and the mail is printed by a printer section (2). When the variable FORWARD is not set to "1", the received mail is transferred to the designated transfer destination or stored by BOX storage.

21 Claims, 12 Drawing Sheets

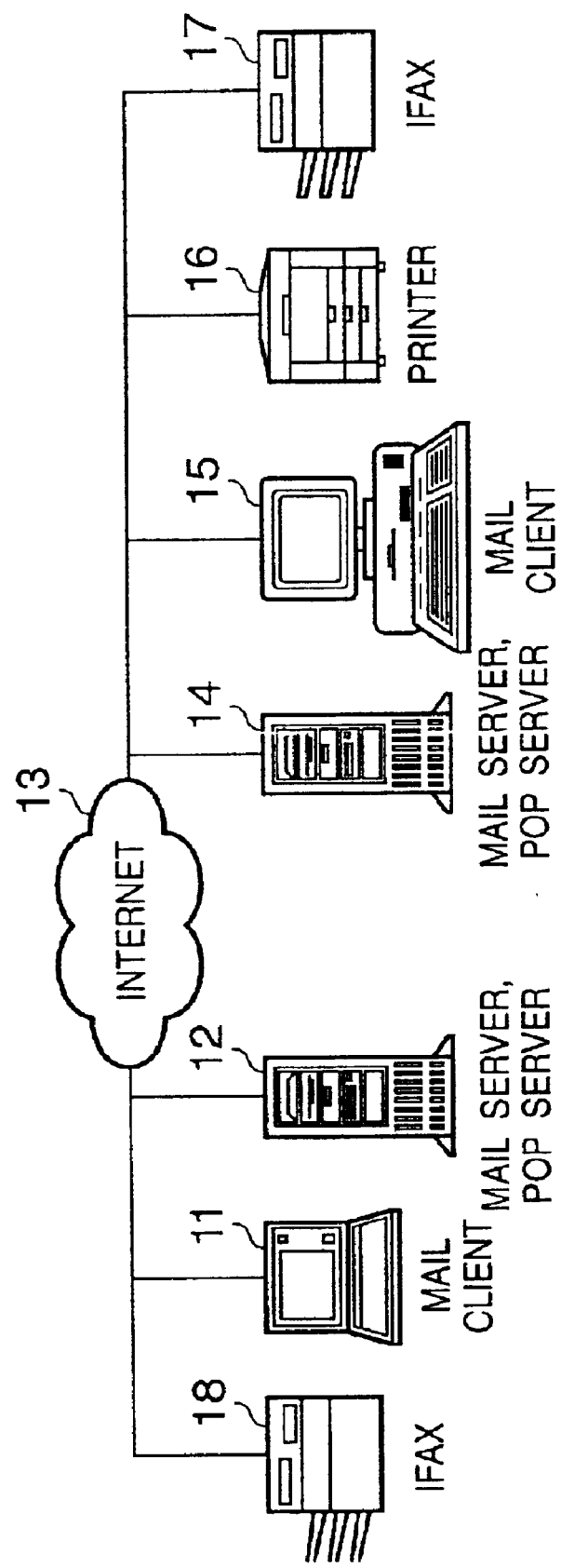

COMMUNICATION APPARATUS, CONTROL METHOD, AND STORAGE MEDIUM THAT CAN IDENTIFY COMMUNICATION ERRORS

FIELD OF THE INVENTION

The present invention relates to a communication apparatus capable of transferring received electronic mail data to a destination, storing the electronic mail data in a storage medium, and printing the electronic mail, and a control method and storage medium therefor.

BACKGROUND OF THE INVENTION

In recent years, along with proliferation of computers and information networking, electronic mail for transmitting/receiving character information through a network is becoming popular. Electronic mail can contain not only a mail text as character information but also files in various formats. For example, a communication apparatus such as an Internet FAX machine which transmits/receives an image by attaching an image file in a TIFF (Tagged Image File Format) format as an attached file has also been proposed.

FIG. 12 is a view showing an arrangement of a conventional electronic mail system including a communication apparatus.

An Internet FAX machine (IFAX) 18, mail client 11, and mail server 12 are connected to a mail server 14, mail client 15, printer 16, and Internet FAX machine (IFAX) 17 through the Internet 13.

Electronic mail software which transmit/receive electronic mail is installed in the mail client 11. In the mail client 11, when electronic mail text data and transmission destination information (e.g., the user name of the mail client 15) are input, and transmission of the electronic mail is instructed, the electronic mail is transmitted to the mail server 12 serving as a POP (Post Office Protocol) server in accordance with the SMTP (Simple Mail Transfer Protocol).

Upon receiving the electronic mail, the mail server 12 determines on the basis of the destination information of the electronic mail data that the transfer destination is the mail server 14 serving as a POP server, and transmits the electronic mail to the mail server 14 through the Internet 13. The mail server 14 receives the electronic mail and stores the received electronic mail in its mail box.

The electronic mail software which transmit/receive electronic mail is also installed in the mail client 15. The mail client 15 checks every predetermined time in accordance with the POP3 (Post Office Protocol Version 3) whether or not new electronic mail has arrived at the mail box of the mail server 14. If new electronic mail has arrived, the electronic mail is downloaded and opened. Thus, the electronic mail text generated by the mail client 11 is displayed. The text or attached file of the electronic mail text can be printed by the printer 16 through a printer driver installed in the mail client 15.

To transmit an image read by the IFAX 17 to the IFAX 18, similarly, the image is transferred through the mail server 14, Internet 13, and mail server 12 and printed by the IFAX 18.

The communication apparatus such as an Internet FAX machine has a transfer function and BOX storage function and therefore can transfer received electronic mail to a designated transfer destination by facsimile, transfer the electronic mail to a third party using an electronic mail protocol, or store the electronic mail in a predetermined recording medium (memory BOX).

In the conventional communication apparatus, when electronic mail is transmitted, it is transferred through a plurality of mail servers. For this reason, even when a transmission error occurs due to an incorrect destination in transmission, the transmission error is not immediately detected. However, when the error is indicated by an intermediate mail server, the mail server that has found the error transmits to the transmission source error notification mail (result report) for notifying the transmission source of the transmission error, so the sender is informed of the error.

However, in the reception mode, since the conventional communication apparatus such as the Internet FAX uses the electronic mail system, not only image data of a TIFF image file but also files that cannot be handled by the Internet FAX machine, e.g., a moving image file or voice data file may be received. In addition, even a TIFF image file may have been compressed by a scheme that cannot be handled by the receiving-side communication apparatus or may be an image file that cannot be handled because the image resolution is high. Even electronic mail data that can be handled by the receiving-side communication apparatus may cause an error due to an error in intermediate mail server or network.

If such electronic mail data that cannot be handled by the receiving-side communication apparatus or electronic mail data having an error is transferred by the transfer function, incorrect data is transferred, resulting in trouble for the receiver. In addition, if the electronic mail data is stored by the BOX storage function, the receiver may be unaware of the error (error in the received mail) or that the mail cannot be handled.

In the transmission mode, when error notification mail (result report) is transmitted, and the above transfer function or BOX storage function is operating at that time, the erroneous mail is transferred or stored. For this reason, the sender can hardly grasp the presence of the erroneous mail and may be unaware of the transmission error.

SUMMARY OF THE INVENTION

The present invention has been made to solve the above problems of the prior art, and has as its first object to provide a communication apparatus capable of notifying a receiver of a reception mail error by printing or the like and preventing incorrect data from being transferred or stored without notifying the user of the error, and a control method and storage medium therefor.

It is the second object of the present invention to provide a communication apparatus capable of notifying a sender of a transmission mail error by printing or the like and preventing error notification mail from being transferred or stored without notifying the user of the error, and a control method and storage medium therefor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a view showing an arrangement of a conventional electronic mail system including a communication apparatus.

DETAILED DESCRIPTION OF THE PREFERRED EMBODIMENT

A preferred embodiment of the present invention will be described below in detail with reference to the accompanying drawings. The relative layout, display window, and the like of components described in this embodiment do not limit the scope of the present invention unless otherwise specified.

(Embodiment)

Figure 1:
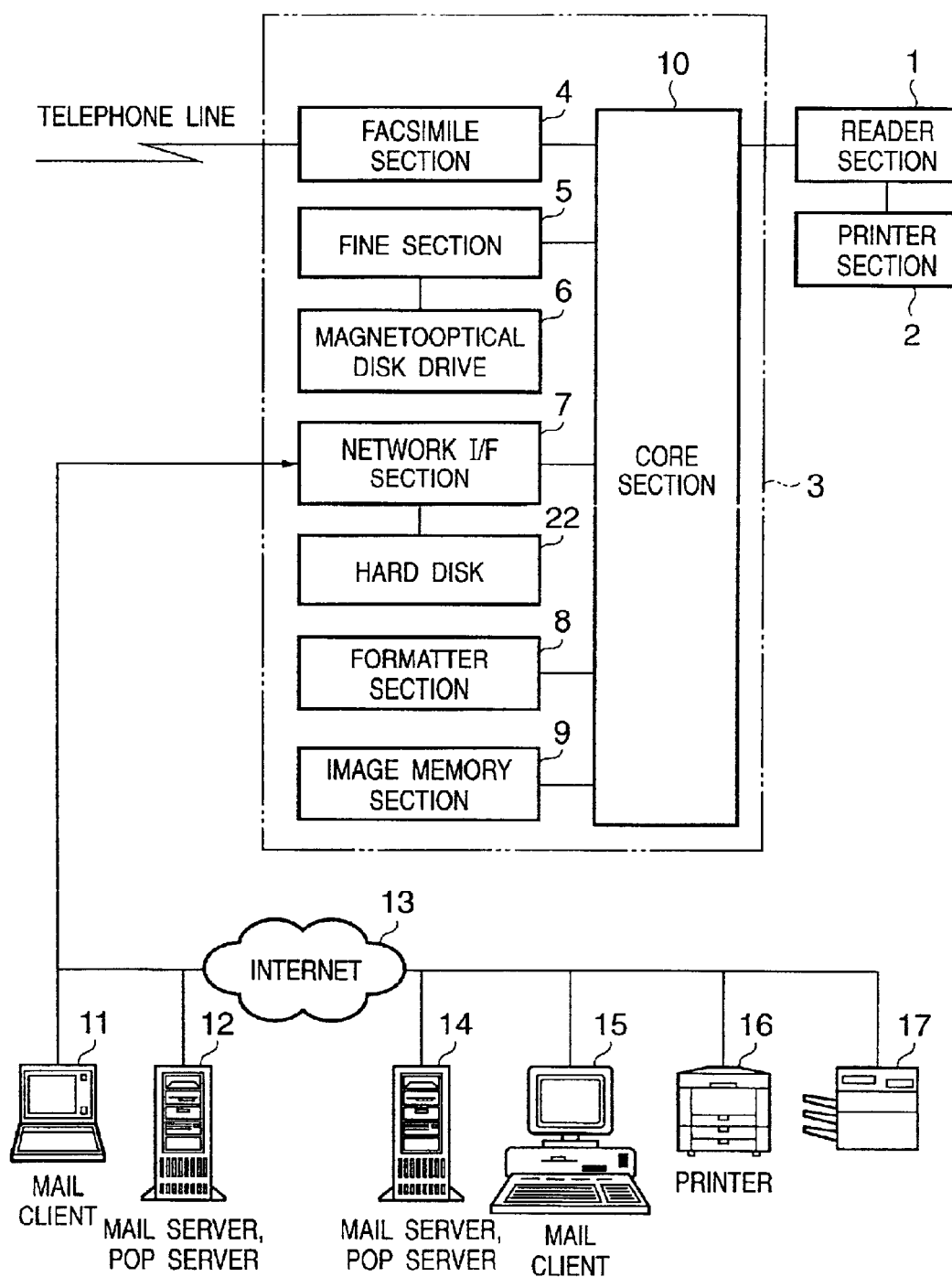
FIG. 1 is a block diagram showing an overall arrangement of a communication apparatus and network according to an embodiment of the present invention.

FIG. 1 is a block diagram showing an overall arrangement of a communication apparatus and network according to an embodiment of the present invention.

This communication apparatus comprise, e.g., an Internet FAX machine and comprises a reader section 1, printer section 2 (printing means), and image input/output control section 3.

This communication apparatus, mail client 11, and mail server 12 are connected to a mail server 14, mail client 15, printer 16, and Internet FAX machine (IFAX) 17 through the Internet 13.

The reader section 1 reads the image of an original and outputs the image data obtained by reading to the printer section 2 and image input/output control section 3 connected to the reader section 1. The printer section 2 prints, on a print paper sheet (not shown), an image corresponding to the image data received from the reader section 1 and image input/output control section 3.

The image input/output control section 3 is connected to the reader section 1 and comprises a facsimile section 4, file section 5, magnetooptical disk drive 6 (part of transfer/storage means), network interface (I/F) section 7 (reception means, part of transfer/storage means, and transmission means), formatter section 8, image memory section 9, core section 10 (part of transfer/storage means, reception mail error determination means, control means, and transmission error determination means), and hard disk 22.

The facsimile section 4 expands compressed image data received through a telephone line and transfers the expanded image data to the core section 10. The facsimile section 4 also compresses image data transferred from the core section 10 and transmits the compressed image data to the outside through the telephone line.

The magnetooptical disk drive 6 is connected to the file section 5. The file section 5 compresses image data transferred from the core section 10 and stores (BOX storage) the image data in a magnetooptical disk (predetermined memory) (not shown) set in the magnetooptical disk drive 6 together with a keyword used to search for the image data. The memory for BOX storage is not limited to the magnetooptical disk. The file section 5 also searches for compressed image data stored in the magnetooptical disk on the basis of a keyword transferred through the core section 10, reads out and expands the detected compressed image data, and transfers the expanded image data to the core section 10.

The network I/F section 7 has an interface for connecting the image input/output control section 3 to the network. The network I/F section 7 is connected to the mail server 12 serving as a POP (Post Office Protocol) server and then to the world-wide Internet 13. The hard disk 22 is connected to the network I/F section 7. The hard disk 22 can store data received by the mail server 12.

The formatter section 8 bitmaps code data representing an image, which is transferred from a computer connected to the network I/F section 7, into image data printable by the printer section 2. The image memory section 9 temporarily stores transferred image data. The core section 10 is connected to the reader section 1, facsimile section 4, file section 5, network I/F section 7, formatter section 8, and image memory section 9 to control the data flow between the blocks. Details will be described later.

A plurality of mail servers, including the mail server 14, are connected to the Internet 13 so that electronic mail can be transmitted/received to/from many people.

The arrangements of the reader section 1 and printer section 2 will be described with reference to FIG. 2 and also FIG. 1 as needed.

Figure 2:
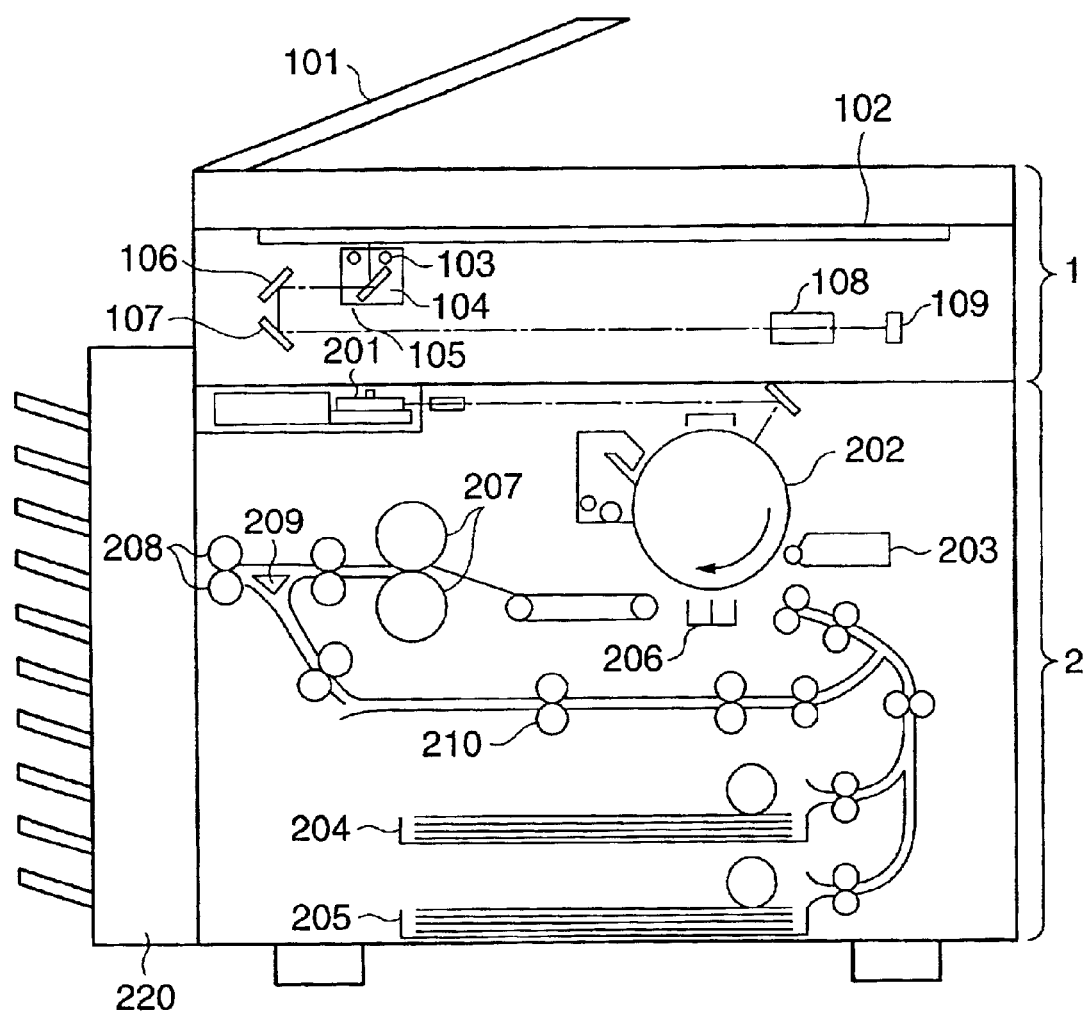
FIG. 2 is a sectional view of a reader section and printer section.

FIG. 2 is a sectional view of the reader section 1 and printer section 2. The reader section 1 and printer section 2 are integrated to form an image input/output device.

An original feeder 101 of the reader section 1 sequentially feeds original pages one by one, from the last page, onto a platen glass 102, and after the end of original read operation, discharges the original on the platen glass 102. When the original is conveyed onto the platen glass 102, a lamp 103 is turned on, and a scanner unit 104 starts moving to expose and scan the original. Reflected light from the original is guided to a CCD image sensor (to be referred to as a "CCD" hereinafter) 109 by mirrors 105, 106, and 107 and lens 108. The image of the scanned original is read by the CCD 109, photoelectrically converted into image data, and output. The image data output from the CCD 109 is subjected to predetermined processing and transferred to the printer section 2 and the core section 10 of the image input/output control section 3 through video buses (not shown).

A laser driver (not shown) of the printer section 2 drives a laser emitting section 201 to make the laser emitting section 201 emit a laser beam corresponding to the image data output from the reader section 1. A photosensitive drum 202 is irradiated with the laser beam while being scanned, and a latent image corresponding to the laser beam is formed on the photosensitive drum 202. A developing agent is applied to the latent image portion on the photosensitive drum 202 by a developing device 203, so the latent image is converted into a visible image. At a timing synchronous with the start of laser beam irradiation, a print paper sheet is fed from a cassette 204 or 205 and conveyed to a transfer section 206. The developing agent that sticks to the photosensitive drum 202 is transferred to the print paper sheet. The print paper sheet with the developing agent is conveyed to a fixing section 207. The developing agent image is fixed to the print paper sheet by heat and pressure of the fixing section 207.

The print paper sheet passing through the fixing section 207 is discharged by discharge rollers 208. A sorter 220 stores the discharged print paper sheets in the respective bins, thereby sorting the print paper sheets. The printer section 2 is designed to be able to set various output modes. When a sorting mode is not set, the sorter 220 stores the print paper sheets in the uppermost bin. When a double-side printing mode is set, after the print paper sheet is conveyed to the discharge rollers 208, the rotational direction of the discharge rollers 208 is reversed to guide the print paper sheet to the re-feed convey path by a flapper 209. When a multiple printing mode is set, the print paper sheet is guided to a re-feed convey path 210 by the flapper 209 without being conveyed to the discharge rollers 208. The print paper sheet guided to the re-feed convey path 210 is fed to the transfer section 206 at the above-described laser beam irradiation start timing.

The reader section 1 will be described next in detail.

Figure 3:
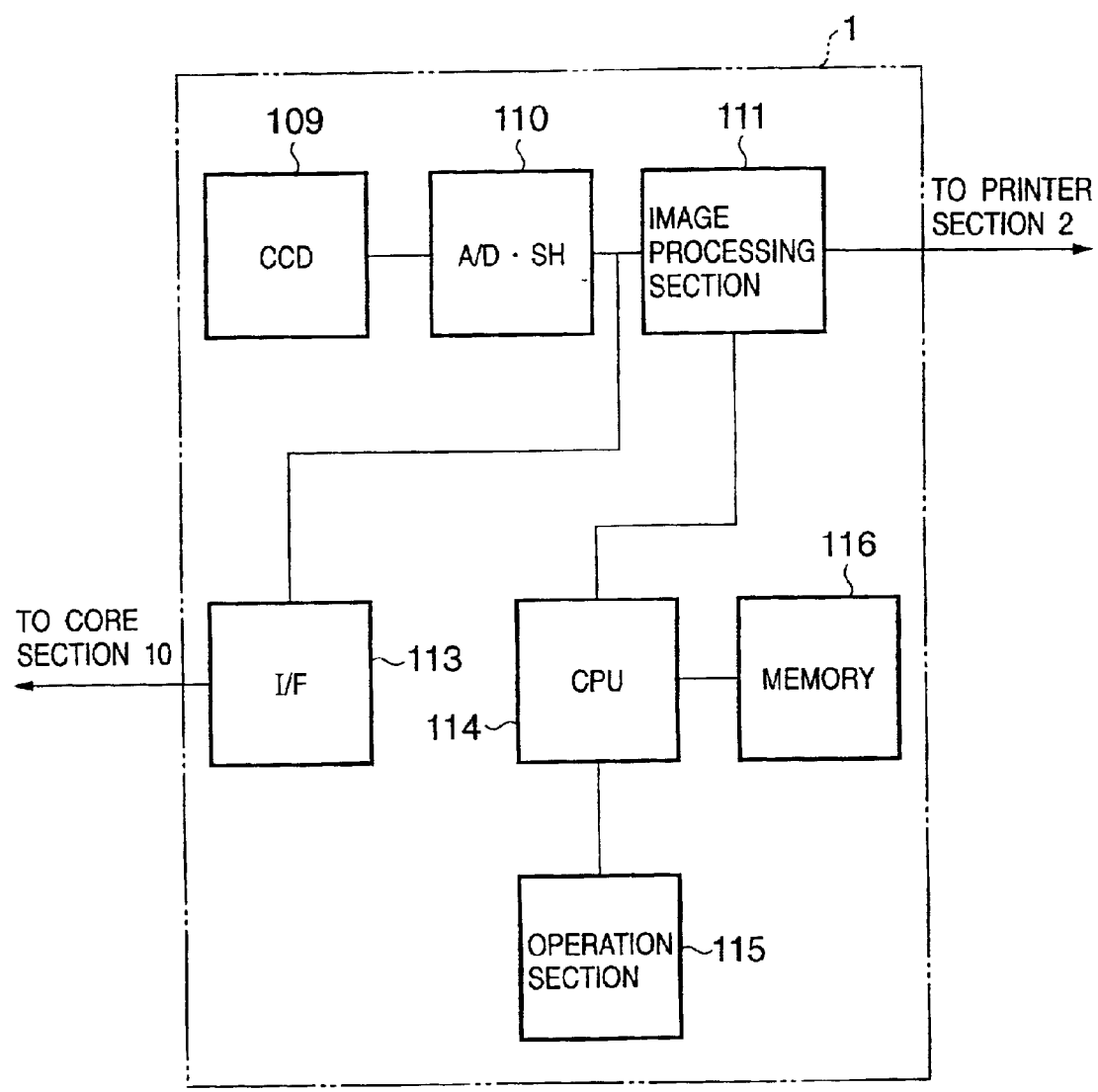
FIG. 3 is a block diagram showing an arrangement of the reader section.

FIG. 3 is a block diagram showing an arrangement of the reader section 1. A CPU (Central Processing Unit) 114 is connected to an image processing section 111, operation section 115, memory 116, and interface 113.

Image data output from the CCD 109 is A/D-converted and also subjected to shading correction by an A/D•SH section 110 connected to the CCD 109. The image data processed by the A/D•SH section 110 is transferred to the printer section 2 through the image processing section 111 connected to the A/D•SH section 110 and also transferred to the core section 10 of the image input/output control section 3 through the interface (I/F) section 113.

The image processing section 111 executes various image processing operations such as trimming. The interface 113 interfaces to the core section 10 to, e.g., receive data including image data transferred from the core section 10.

The CPU 114 controls the image processing section 111 and interface 113 in accordance with contents set by the operation section 115. For example, when the operation section 115 sets a copy mode for executing trimming and copy, the CPU 114 causes the image processing section 111 to trim the image data and transfer it to the printer section 2. When a facsimile transmission mode is set, image data and a control command corresponding to the facsimile transmission mode are transferred from the interface 113 to the core section 10. The control program for the CPU 114 is stored in the memory 116. The CPU 114 performs control while looking up the memory 116. The memory 116 is also used as the working area of the CPU 114.

The core section 10 will be described next in detail.

Figure 4:
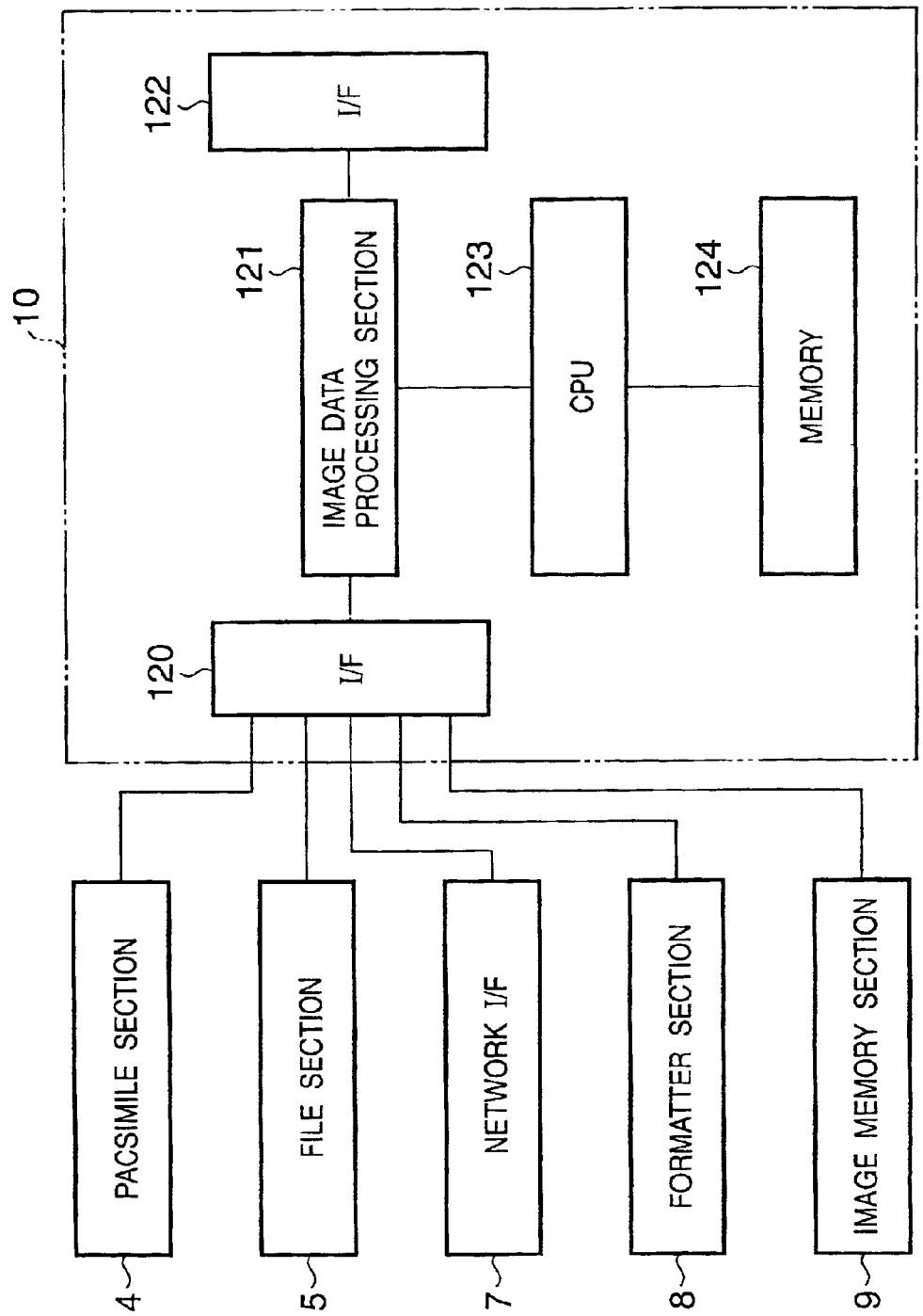
FIG. 4 is a block diagram showing an arrangement of a core section and related elements.

FIG. 4 is a block diagram showing an arrangement of the core section 10 and related elements. The core section 10 comprises an interface (I/F) 120, image data processing section 121, interface (I/F) 122, CPU 123, and memory 124. The interface 120 is connected to the facsimile section 4, file section 5, network interface section 7, formatter section 8, and image memory section 9. The interfaces 120 and 122 are connected to the data processing section 121. The data processing section 121 and memory 124 are connected to the CPU 123.

Image data from the reader section 1 is transferred to the data processing section 121 through the interface 122, and a control command from the reader section 1 is transferred to the CPU 123. The data processing section 121 executes image processing such as image rotation or enlargement/reduction. The image data transferred from the reader section 1 to the data processing section 121 is transferred to the facsimile section 4, file section 5, or network interface section 7 through the interface 120 in accordance with the control command transferred from the reader section 1.

Code data representing an image, which is input through the network interface section 7, is transferred to the data processing section 121 through the interface 120, and then to the formatter section 8, and is bitmapped to image data. This image data is transferred to the data processing section 121 and then to the facsimile section 4 or to the printer section 2 through the interface 122. The image data received by the facsimile section 4 is transferred to the data processing section 121 and then to the printer section 2, file section 5, or network interface section 7. Image data from the file section 5 is transferred to the data processing section 121 and then to the printer section 2, facsimile section 4, or network interface section 7.

The CPU 123 controls data transfer between the blocks in accordance with the control program stored in the memory 124 and a control command transferred from the reader section 1 and also control execution of image processing by the data processing section 121. The memory 124 is also used as the working area of the CPU 123. In this way, processing as a composite of functions is executed mainly in the core section 10, including original image reading, image printing, image transmission/reception, image storage, and data input/output to/from the computer.

Figure 5:
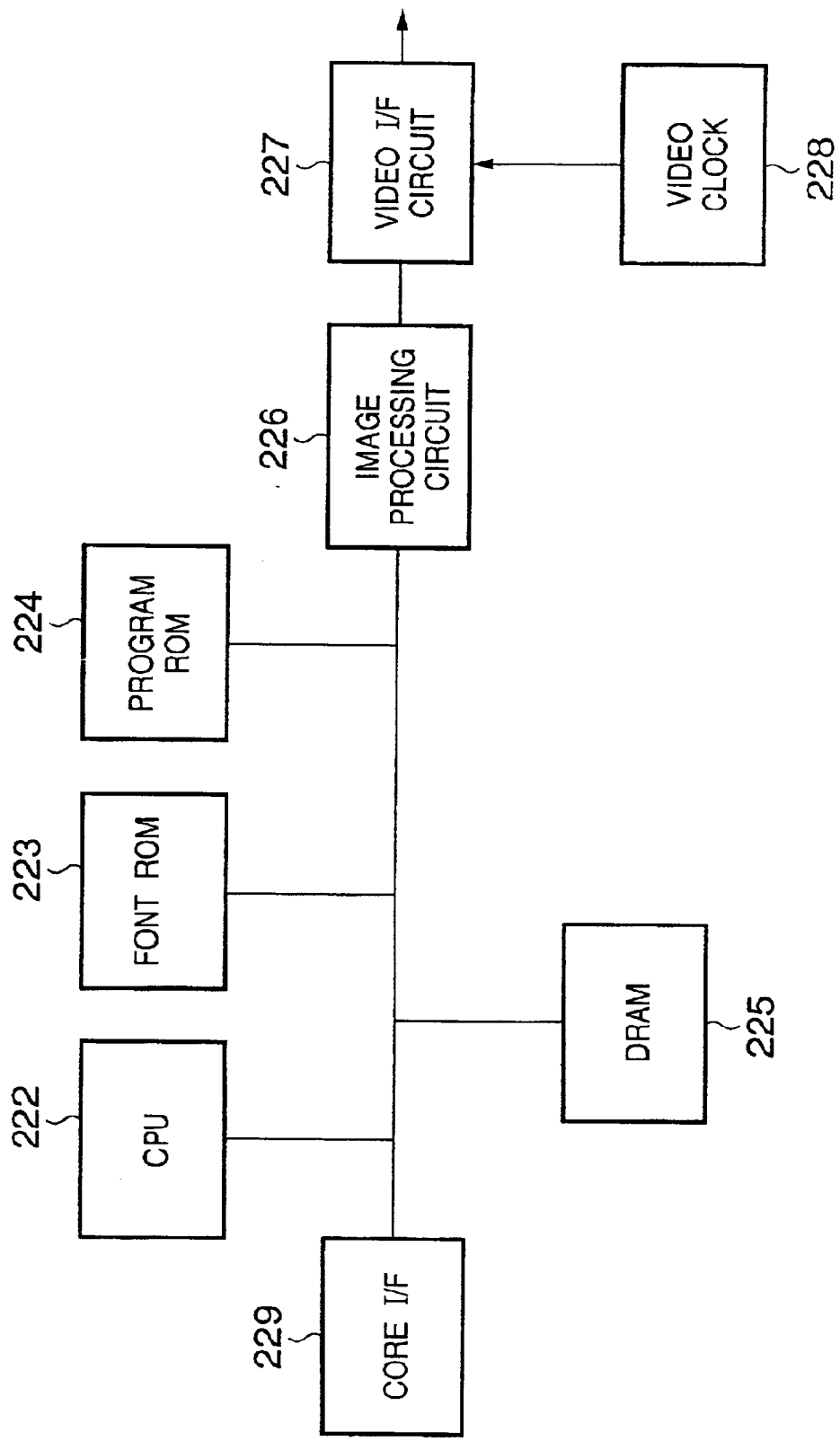
FIG. 5 is a block diagram showing an arrangement of a formatter section.

FIG. 5 is a block diagram showing an arrangement of the formatter section 8.

As shown in FIG. 5, a core interface (I/F) 229, font ROM 223, program ROM 224, DRAM 225, and image processing circuit 226 are connected to a CPU 222. A video interface (I/F) 227 is connected to the image processing circuit 226. A video clock 228 is connected to the video I/F 227.

Data generated by a wordprocessor application or the like of the mail client 11 is converted into a PDL (Page Description Language) such as a PS (Post Script) printable by the printer through a printer driver. The converted data is transferred to the formatter section 8 through the network I/F section 7, core section 10, and core I/F 229.

The transferred data is decoded by the CPU 222, and an image is formed using the font ROM 223 and DRAM 225. This image is processed by the image processing circuit 226 and transferred to the core section 10 through the video I/F 227 in synchronism with a sync signal generated by the video clock 228. The transferred image is printed by the printer section 2. The program ROM 224 stores a control program for executing the above operation. In this manner, a PDL such as a PS can be printed.

The formatter section 8 can be modified for each PDL. The program ROM 224 stores different programs for PDLs and their versions. The user can select a PDL and its version in accordance with the purpose.

Figure 6:
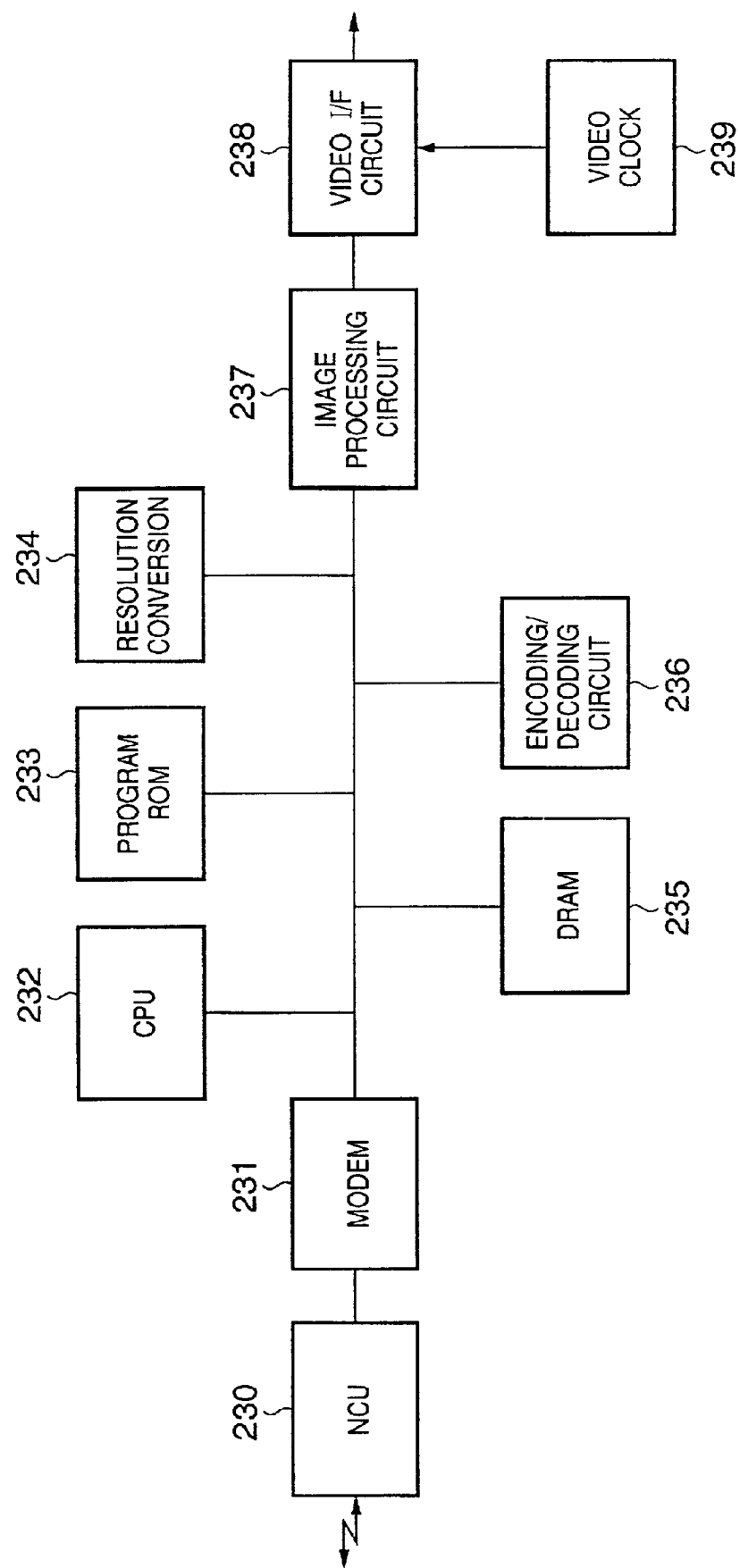
FIG. 6 is a block diagram showing an arrangement of a facsimile section.

FIG. 6 is a block diagram showing an arrangement of the facsimile section 4.

As shown in FIG. 6, a MODEM (MOdulator/DEModulator) 231, program ROM 233, resolution conversion circuit 234, DRAM 235, encoding/decoding circuit 236, and image processing circuit 237 are connected to a CPU 232. A video interface (I/F) 238 is connected to the image processing circuit 237. A video clock 239 is connected to the video I/F 238. An NCU (Network Control Unit) 230 is connected to the MODEM 231.

The NCU 230 is a circuit for connecting the FAX machine to a telephone set. The NCU 230 switches the telephone/FAX, detects a ringing signal in the reception mode, and holds a DC loop signal from a telephone switching system during speech communication. The MODEM 231 is a modulation/demodulation circuit for converting an analog signal into a digital signal or a digital signal into an analog signal.

Data transmitted from another FAX machine is received by the NCU 230 and converted into a digital signal by the MODEM 231. This data has been obtained by encoding an image by MH (Modified Huffman), MR (Modified Read), MMR (Modified Modified Read), or JPEG. The data is decoded by the encoding/decoding circuit 236, and the image data is bitmapped on the DRAM 235. The image data is subjected to resolution conversion by the resolution conversion circuit 234 and processed by the image processing circuit 237. The image data is transferred to the core section 10 through the video I/F 238 in synchronism with a clock generated by the video clock 239, and printed by the printer section 2.

In the transmission mode, image data read by the reader section 1 is bitmapped on the DRAM 235 by the video I/F 238, video clock 239, and image processing circuit 237 through the core section 10. The bitmapped data is subjected to resolution conversion by the resolution conversion circuit 234 and encoded into MH, MR, MMR, or JPEG data by the encoding/decoding circuit 236. The encoded data is converted into an analog signal by the MODEM 231 and transmitted by the NCU 230.

The CPU 232 controls the above transmission/reception. The font ROM 223 stores a control program used by the CPU 232 to execute the above operation. The facsimile section 4 can be detached from the communication apparatus in accordance with the application purpose of the user.

Figure 7:
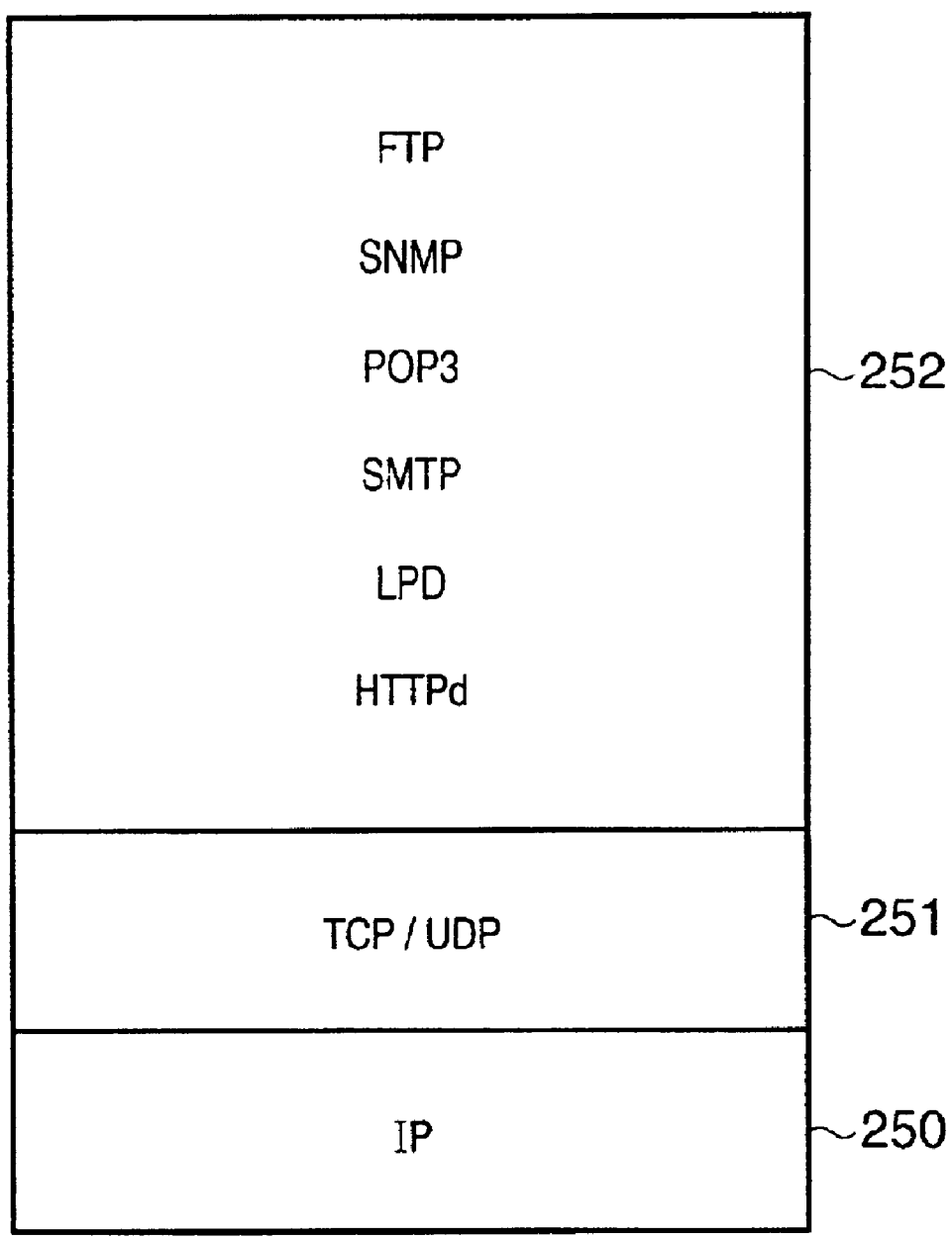
FIG. 7 is a view showing a program structure in a network I/F section.

FIG. 7 is a view showing a program structure in the network I/F section 7.

The program in the network I/F section 7 is formed from a program for operating an IP (Internet Protocol) 250, TCP (Transmission Control Protocol)/UDP (User Datagram Protocol) 251, and application layer protocol 252, as shown in FIG. 7. The IP 250 is the protocol of the Internet, i.e., a network layer for providing a service for sending a message from a transmitting host to a receiving host in synchronism with a relay node such as a router. The most important pieces of information for message transmission are sender and receiver addresses. The sender and receiver addresses are managed by the IP 250. Routing for determining the route in the network through which a message is sent to the receiving host in accordance with address information is done by the IP 250.

The TCP/UDP 251 is the protocol of a transport layer for providing a service for sending a message from a transmitting application process to a receiving application process. The TCP is a connection type service and guarantees high communication reliability. The UDP is a connectionless service and does not guarantee communication reliability.

The protocol 252 of the application layer defines a plurality of protocols including an FTP (File Transfer Protocol) as a file transfer service, SNMP (Simple Network Management Protocol) as a network management protocol, POP3 (Post Office Protocol Version 3) as a mail download protocol, SMTP (Simple Mail Transfer Protocol) as an electronic mail transmission/reception protocol, LPD as a server protocol for a printer, and HTTPd (Hypertext Transfer Protocol daemon) as the protocol of a WWW (World-Wide Web) server.

Operation for receiving electronic mail and printing the received electronic mail will be described next.

Electronic mail software which transmit/receive electronic mail is installed in the mail client 15 shown in FIG. 1. In the mail client 15, when electronic mail text data and transmission destination information (e.g., the mail address of the mail client 11 or the mail address of the communication apparatus) are input, and transmission of the electronic mail is instructed, the electronic mail is transmitted to the mail server 14 in accordance with the SMTP.

Upon receiving the electronic mail, the mail server 14 determines, on the basis of the destination information of the electronic mail data, that the transfer destination is the mail server 12 and transmits the electronic mail to the mail server 12 through the Internet 13. The electronic mail is received by the mail server 12. When the mail address is set for the communication apparatus, the mail is directly distributed to the communication apparatus using the SMTP protocol. When the mail box in the mail server 12 is designated by the mail address, the received electronic mail is stored in the mail box.

The electronic mail software which transmit/receive electronic mail is also installed in the mail client 11. The mail client 11 checks every predetermined time, in accordance with the POP3, whether or not new electronic mail has arrived at the mail box of the mail server 12. If new electronic mail has arrived, the electronic mail is downloaded and opened. To transmit an image read by the IFAX 17 to the communication apparatus, similarly, the image is transferred through the mail server 14, Internet 13, and mail server 12. The image can be printed by the communication apparatus.

Figure 8:
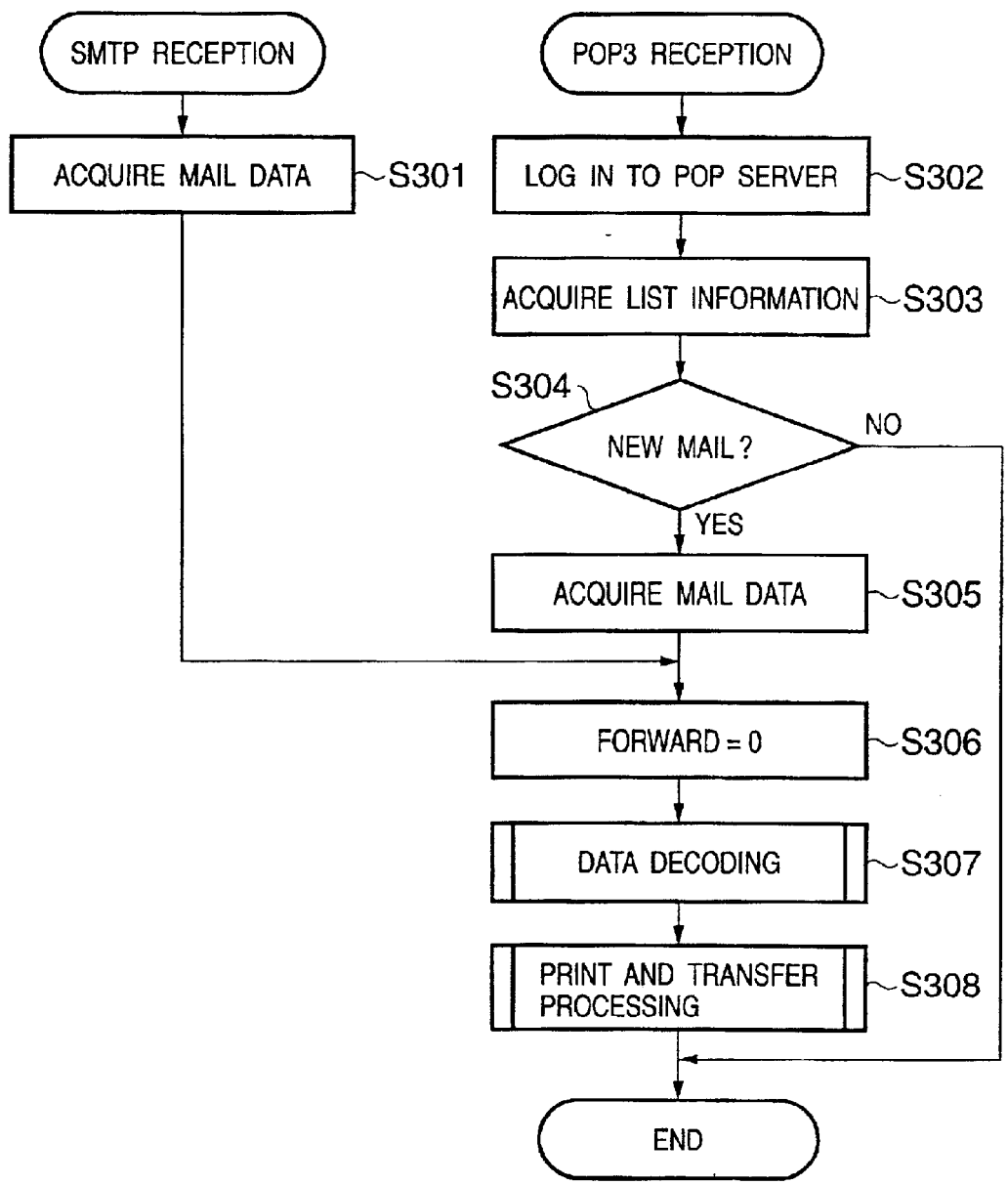
FIG. 8 is a flow chart showing processing of receiving and printing electronic mail in a communication apparatus.

FIG. 8 is a flow chart showing processing of receiving and printing electronic mail in a communication apparatus.

When electronic mail is distributed by the SMTP, SMTP reception is performed. In step S301, electronic mail data is acquired in accordance with the SMTP protocol. The flow advances to step S306.

On the other hand, POP3 reception is performed every predetermined time to check whether or not the mail box in the mail server 12 is designated by a mail address, and new electronic mail has arrived at the mail box.

When POP3 reception is activated, the mail server 12 serving as a POP server is logged in (step S302), list information of mail messages stored in the mail box in the mail server 12 is acquired (step S303), and it is determined whether or not new mail is present in the mail box (step S304). This determination is done by collating list information obtained by the previous login with that obtained by the current login.

If NO in step S304, the processing is immediately ended. If YES in step S304, the electronic mail data is downloaded and acquired in accordance with the POP3 protocol (step S305), and the flow advances to step S306.

In step S306, since the electronic mail is received by the SMTP or POP3 protocol, a global variable FORWARD is set to an initial value "0". The acquired electronic mail data is decoded from electronic mail format data into image data by data decoding processing shown in FIGS. 9 and 10 (to be described later) (step S307). Print or transfer processing in FIG. 11 (to be described later) is executed to print the image data by the printer section 2 or transfer the image data to a transmission device such as the facsimile section 4 (step S308). After that, the processing is ended.

The acquired electronic mail data can be not only printed or transferred but also displayed as a mail information list on the operation section 115. In addition, when mail data is selected from the displayed list, the contents can be displayed on the operation section 115.

Figure 9:
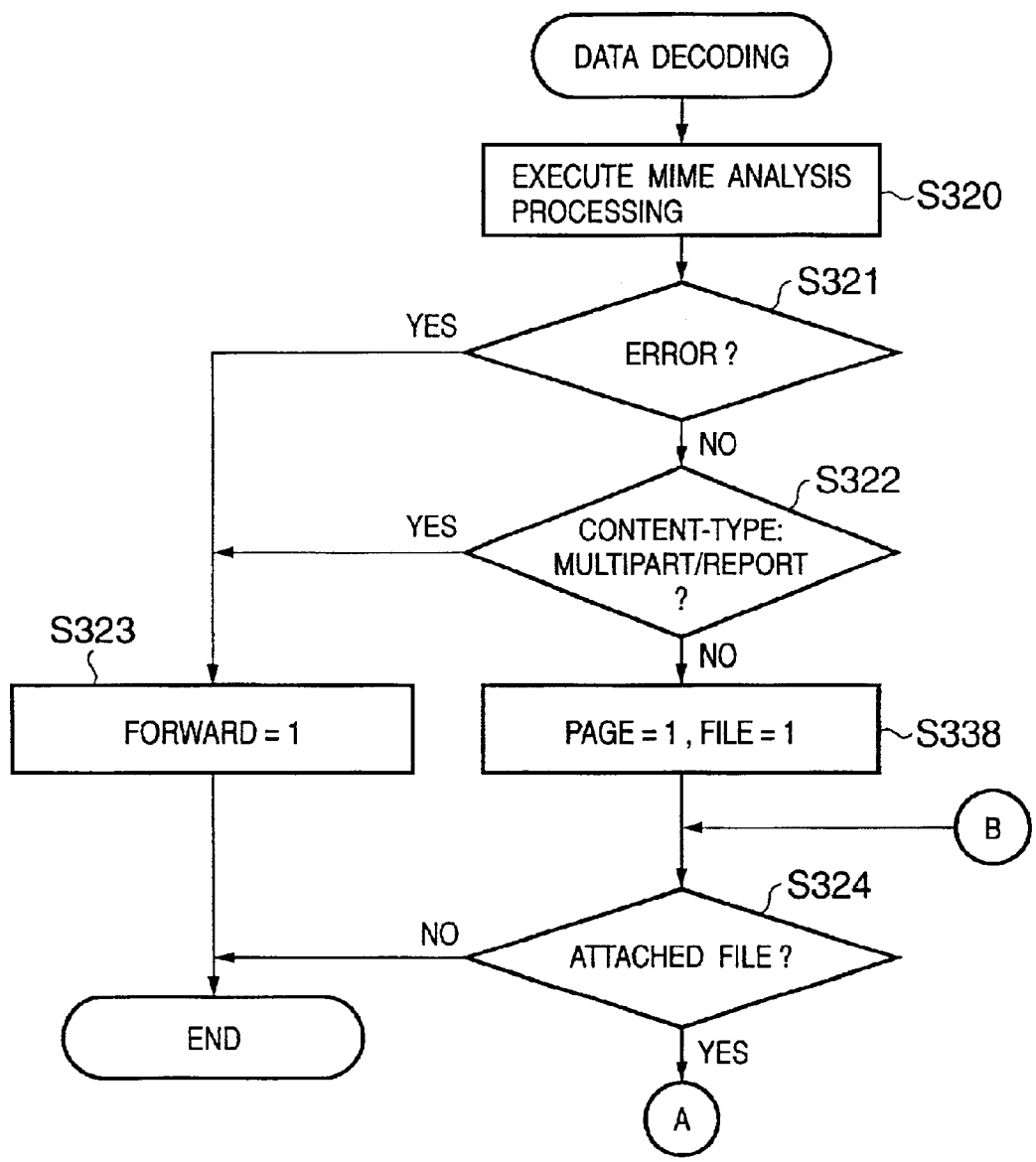
FIG. 9 is a flow chart showing data decoding processing executed in step S307 of FIG. 8.
Figure 10:
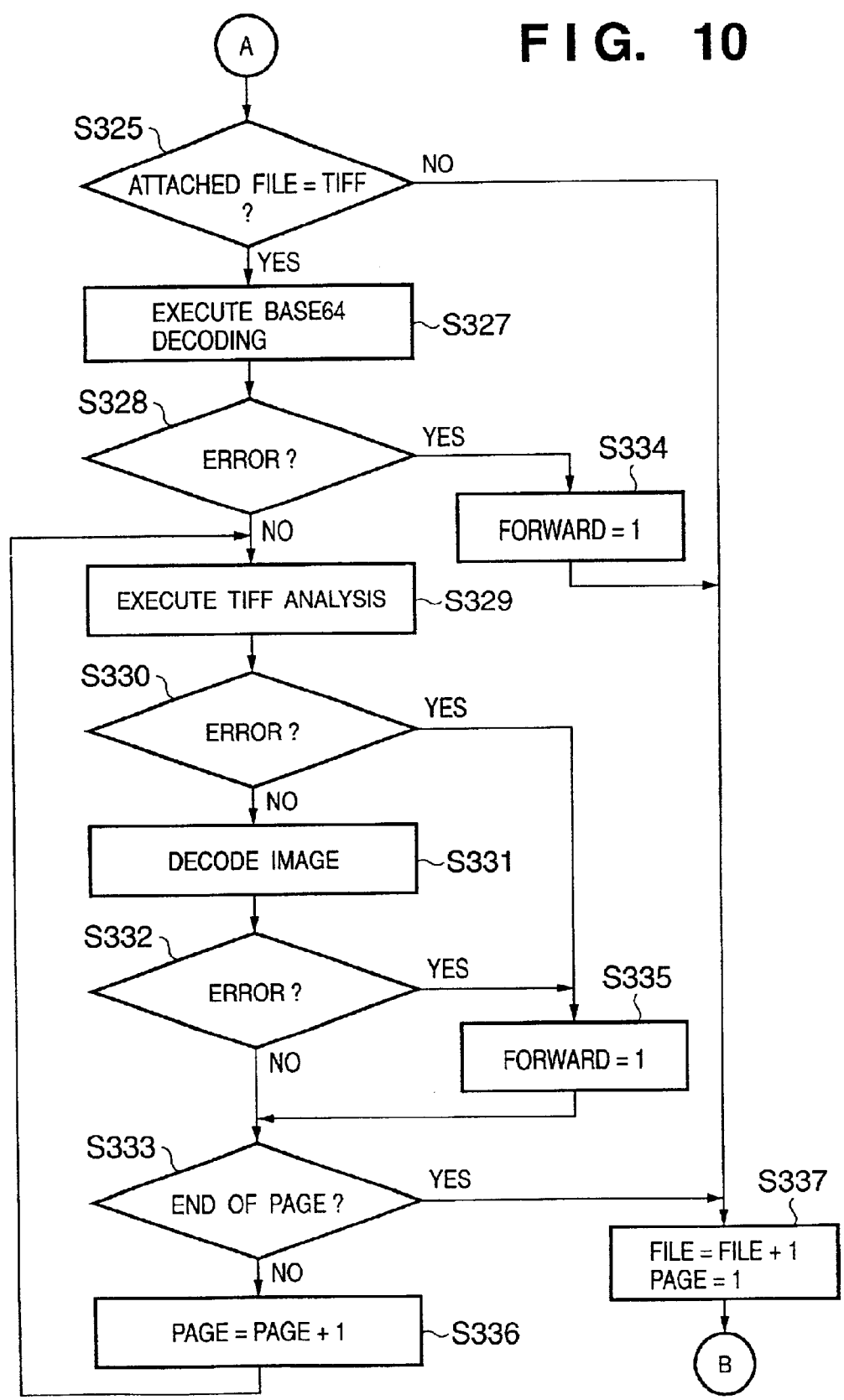
FIG. 10 is a flow chart showing data decoding processing executed in step S307 of FIG. 8 (continued from FIG. 9)

FIGS. 9 and 10 are flow charts showing data decoding processing executed in step S307 of FIG. 8.

First, MIME (Multipurpose Internet Mail Extensions) analysis processing is executed (step S320). That is, various pieces of information including transmission source information "From", transmission destination information "To", and "Subject" information are acquired from the information of the mail header field, and the electronic mail format is analyzed to separate the mail text from the attached file portion. In the MIME analysis processing, when the MIME information is incorrect, e.g., when a code representing the start of an attached file is detected while a code representing the end cannot be detected, it is determined that a MIME analysis processing error has occurred, and the processing is ended.

It is determined whether or not a MIME analysis processing error has occurred (step S321). If NO in step S321, it is determined whether or not Content-Type information as one of the pieces of MIME information is multipart/report (step S322). Mail whose Content-Type information is multipart/report is mail of a DSN report (result report). This mail is used as error notification mail which is sent from a mail server to the transmission source to notify it that the transmitted mail has an error when, e.g., the destination information of the transmitted electronic mail is incorrect, and the mail server cannot transfer the mail. If NO in step S332, the flow advances to step S338. In this case, "0" is kept set to the global variable FORWARD.

If YES in step S321, or if YES in step S322, the flow advances to step S323. In step S323, the global variable FORWARD is set to "1", and the processing is ended.

In step S338, a variable PAGE representing page number information and a variable FILE representing attached file number information are initialized to "1". It is determined next whether or not an attached file having the number defined by the variable FILE is detected by the MIME analysis processing (step S324). If NO in step S324, the processing is ended. If YES in step S324, the flow advances to step S325.

In step S325, it is determined whether or not the detected attached file is a TIFF file. This determination is done by determining whether or not the Content-Type information is designated as Content-Type: image/tiff. If the Content-Type information is designated as image/tiff, the attached file is determined as a TIFF file. If NO in step S325, the variable FILE is incremented by "1", and the variable PAGE is initialized to "1" (step S337), and the flow returns to step S324. This process can cope with a plurality of attached files.

If YES in step S325, BASE64 decoding is performed (step S327). The BASE64 decoding converts character data with four characters into 8-bit data of 3 bytes. As character data, "A" to "Z", "a" to "z", "0" to "9", "+", "−", and "=" are used. In the BASE64 decoding, if the received character data contains character data other than the above character data to be used, a BASE64 decoding error is indicated.

It is determined whether or not a BASE64 decoding error is indicated (step S328). If YES in step S328, the global variable FORWARD is set to "1" (step S334), step S337 is executed, and the flow returns to step S324.

If NO in step S328, TIFF analysis is executed (step S329). That is, the stored image information is read from the header information and IFD (Image File Directory) informant of the TIFF. When necessary image information cannot be obtained, or the image data has an image data format that cannot be processed (handled) by the communication apparatus, a TIFF analysis error is indicated. A TIFF file can form multiple pages by storing a plurality of page data in one file.

It is determined whether or not a TIFF analysis error has occurred (step S330). If YES in step S330, the global variable FORWARD is set to "1" (step S335), and the flow advances to step S333. If NO in step S330, the flow advances to step S331.

In step S331, the image is decoded. That is, the image compressed by the MH, MR, or MMR is decoded into the original raw image. If the received data has some error, the entire image may not be decoded. In this case, when a predetermined percentage (e.g., 80%) or more of the original image cannot be decoded, an image decoding error is indicated. The predetermined percentage is appropriately set.

It is determined whether or not an image decoding error has occurred (step S332). If YES in step S332, step S335 is executed, and then, the flow advances to step S333. If NO in step S332, the flow immediately advances to step S333.

In step S33, it is determined whether or not the currently processed page is the last page. If NO in step S333, the variable PAGE is incremented by "1" (step S336), and the flow returns to step S329. Processing for the next page starts to cope with a plurality of pages. If YES in step S333, step S337 is executed, and the flow returns to step S324.

According to the present invention, when analysis of electronic mail data reveals that a MIME analysis processing error is present, a BASE64 decoding error is present, a TIFF analysis error is present, or an image decoding error is present, data that cannot be handled by the communication apparatus is contained, and the global variable FORWARD is set to "1". When the Content-Type information is multipart/report, the received electronic mail is error notification mail, and the global variable FORWARD is set to "1".

Figure 11:
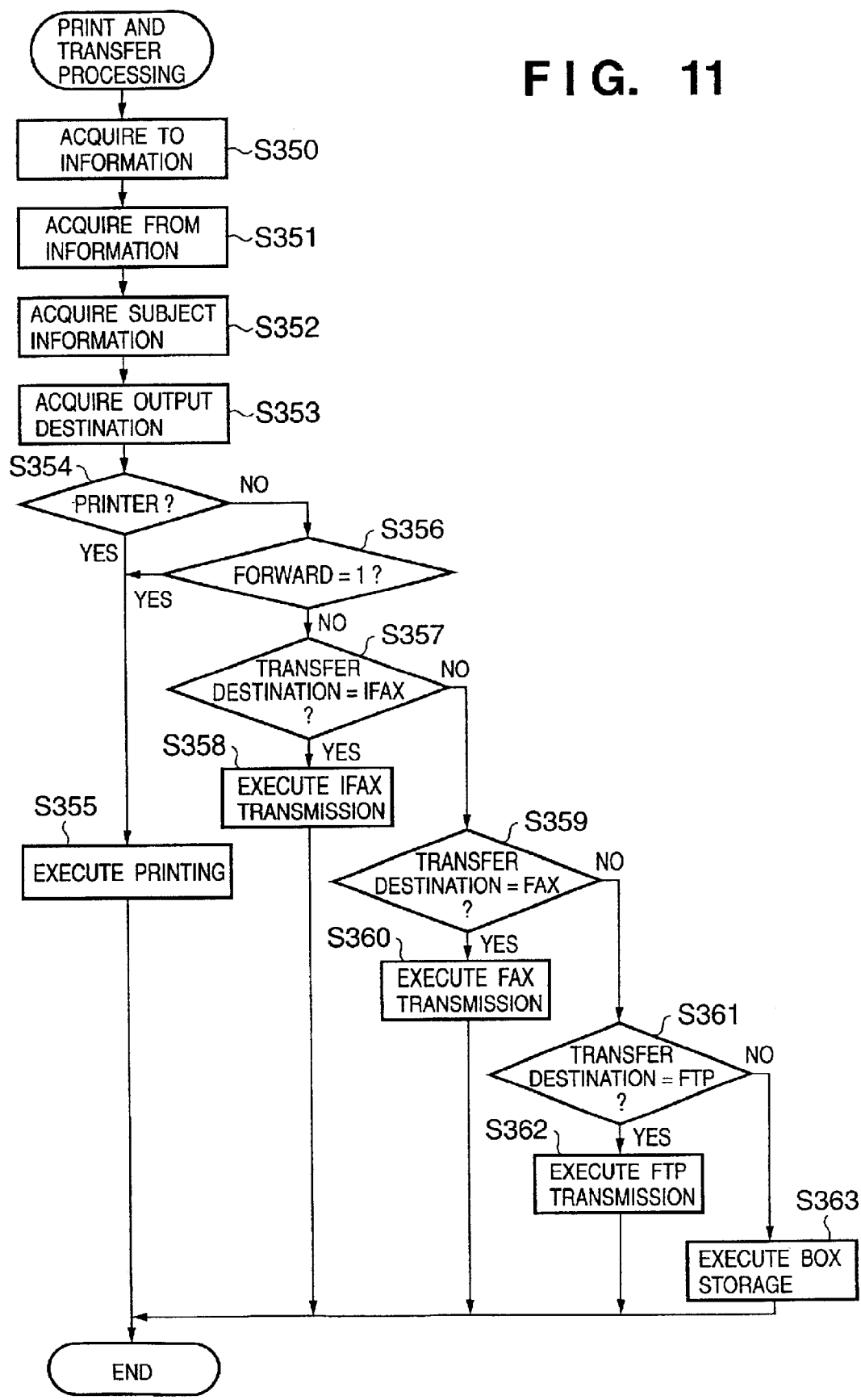
FIG. 11 is a flow chart showing print and transfer processing executed in step S308 of FIG. 8.

FIG. 11 is a flow chart showing print and transfer processing executed in step S308 of FIG. 8.

The print and transfer destination of the electronic mail are determined by determining whether or not pieces of information "To", "From", and "Subject" contained in the mail header, matching conditions of "To", "From", and "Subject" set by the user, and conditions for designating the transfer destination match.

First, the "To" information, "From" information, and "Subject" information acquired from the information in the mail header field by the MIME analysis processing in step S320 are acquired (steps S350, S351, and S352). Next, the output destination (transfer destination), i.e., matching conditions (not shown) of "To", "From", and "Subject" designated by the user in advance is acquired (step S353).

The output/transfer destination is determined on the basis of comparison between the "To" information, "From" information, and "Subject" information acquired from the information in the mail header field with the matching conditions of "To", "From", and "Subject" designated by the user in advance, thereby determining whether or not the output/transfer destination is the printer (step S354).

If YES in step S354, printing is executed (step S355). That is, the electronic mail text data is rasterized and then printed together with the attached file, and a paper sheet on which the image is formed and printed by the printer section 2 is discharged. After that, the processing is ended.

If NO in step S354, it is determined whether or not the global variable FORWARD is set to "1" (step S356). If NO in step S356, no particular error has been detected, and the flow advances to step S357. If YES in step S356, the received mail contains data that cannot be handled by the communication apparatus or the received mail is error notification mail, and step S355 is executed. With this processing, transfer and storage of the mail having the error are inhibited, and data that can be handled is printed as much as possible.

It is determined in step S357 whether or not the output/transfer destination is the IFAX. If YES in step S357, the received electronic mail is transferred to the Internet FAX machine (not shown) by IFAX transmission (step S358), and the processing is ended. If NO in step S357, it is determined whether or not the output/transfer destination is the FAX machine (step S359). If YES in step S359, the received electronic mail is transferred to the FAX machine (not shown) by FAX transmission (step S360), and the processing is ended. If NO in step S359, it is determined whether or not the output/transfer destination is the FTP (step S361). If YES in step S361, the electronic mail is transferred by FTP transmission (step S362), and the processing is ended. If NO in step S361, BOX storage is executed, i.e., the received mail is stored in the magnetooptical disk (predetermined memory) (not shown) in the magnetooptical disk drive 6 connected to the file section 5 (step S363), and the processing is ended.

According to this processing, when the global variable FORWARD is set to "1", transfer and BOX storage of received mail are inhibited, and the received mail is printed by the printer section 2. If the global variable FORWARD is not set to "1", the received mail is transferred to the designated transfer destination.

In this embodiment, when received mail contains data that cannot be handled by the communication apparatus or the received mail has an error, transfer and BOX storage are inhibited. Hence, incorrect data can be prevented from being transferred, thus preventing difficulties to the receiver. In addition, the electronic mail can be prevented from being stored by BOX storage, and the receiver can be prevented from being unaware of the error. In this case, the mail is printed by the printer section 2 without executing transfer or BOX storage. With this processing, the user can be quickly notified of the reception mail error, and the data that can be handled is printed as much as possible to help the receiver. Particularly, this processing is more useful because the error is determined for each file or each page in a file using the variables FILE and PAGE, and data that can be handled is printed. Hence, the receiver can be notified of the reception mail error by printing or the like, so the incorrect data can be prevented from being transferred or stored without notifying the user of the error.

Even when the received mail is error notification mail (result report), transfer and BOX storage are inhibited, and the data is printed by the printer section 2, as in the above case. Hence, the transmission source can be notified of the transmission mail error, and the error notification mail can be prevented from being transferred or stored without notifying the user of the error.

Although not illustrated, in the FAX transfer mode, the communication apparatus cannot handle a character string used in the mail text. For this reason, the apparatus transmits an image obtained by rasterizing the character string and transmits the character string itself with a protocol capable of transferring another character string.

In this embodiment, the TCP/IP is used as the communication protocol of the network. However, the present invention is not limited to this. The same effect as described above can be obtained even using a communication protocol such as an IPX (Internetwork Packet eXchange)/SPX or Apple-Talk. The BASE64 is used as the electronic mail decoding scheme. However, the present invention is not limited to this, and an uuencode scheme or BinHex scheme may be used. In addition, a TIFF file has been exemplified. However, the same effect as described above can be obtained even for an image file format such as JPEG, GIF, or BMP.

In this embodiment, the BOX storage position is not limited to the magnetooptical disk drive 6 and may be, e.g., the hard disk 22.

The object of the present invention is achieved even by supplying a storage medium which stores software program codes for implementing the functions of the above-described embodiment to the communication apparatus and causing the computer (or CPU or MPU) of the communication apparatus to read out and execute the program codes stored in the storage medium.

In this case, the program codes read out from the storage medium implement the new functions of the present invention by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiment are implemented not only when the readout program codes are executed by the computer but also when the OS running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

Generally, according to this embodiment, the receiver is notified of the reception mail error by printing or the like, so the incorrect data can be prevented from being transferred or stored without notifying the receiver of the error.

Data that can be handled can be printed as much as possible to help the receiver.

The transmission source can be notified of the transmission mail error by printing or the like, and the error notification mail can be prevented from being transferred or stored without notifying the user of the error.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   a reception unit adapted to receive electronic mail data;
   a reception mail error determination unit adapted to determine whether or not the electronic mail data received by said reception unit contains data which cannot be handled by the communication apparatus;
   a control adapted to, when said reception mail error determination unit determines that the received electronic mail data contains data which cannot be handled, control to inhibit transfer of the received electronic mail data;
   a printing unit capable of printing the electronic mail data received by said reception unit; and
   an execution unit adapted to, in accordance with designation of a destination contained in the electronic mail data received by said reception unit, execute transfer of the electronic mail data to the destination;
   wherein the control unit causes said printing unit to process the received electronic mail data, when said reception mail error determination unit determines that the received electronic mail data contains the data which cannot be handled.

2. The apparatus according to claim 1,
   wherein said execution unit, in accordance with designation of a destination contained in the electronic mail data received by said reception unit, executes storage of the electronic mail data in a predetermined memory.

3. The apparatus according to claim 1, wherein said control unit causes said printing unit to print, of the received electronic mail data, only data which can be handled by the communication apparatus.

4. The apparatus according to claim 3, wherein said reception mail error determination unit can determine, for each attached file, whether or not the received electronic mail data contains data which cannot be handled, and said control unit causes said printing unit to print, the received electronic mail data, only an attached file which can be handled by the communication apparatus.

5. The apparatus according to claim 4, wherein said reception mail error determination unit can determine, for each page of the attached file, whether or not the received electronic mail data contains data which cannot be handled, and said control unit causes said printing unit to print, of the attached file, only a page which can be handled by the communication apparatus.

6. The apparatus according to claim 1, wherein said reception mail error determination unit analyzes the received electronic mail data and determines that the received electronic mail data contains data which cannot be handled by the communication apparatus when the analysis indicates at least one of a case wherein a MIME analysis processing error is indicated, a case wherein the electronic mail data contains undecodable data, a case wherein more than a predetermined percentage of the electronic mail data cannot be decoded, and a case wherein the electronic mail data contains data in a data format which cannot be handled by the communication apparatus.

7. A communication apparatus comprising:

a transmission unit, adapted to transmit electronic mail data;

a reception unit, adapted to receive electronic mail data;

a transmission error mail determination unit, adapted to analyze the electronic mail data received by said reception unit and to determine whether or not the electronic mail data received by said reception unit is error notification mail data for notifying a user of a transmission error of the electronic mail data transmitted by said transmission unit; and a control unit, adapted to inhibit transfer of the received electronic mail data, in a case where said transmission error mail determination unit determines that the received electronic mail data is error notification mail data.

8. The apparatus according to claim 7, wherein said transmission mail error determination unit analyzes MIME information of the received electronic mail data and determines that the electronic mail data is error notification mail data when Content-Type in the MIME information is multipart/report.

9. A communication apparatus comprising:

a transmission unit adapted to transmit electronic mail data;

a reception unit adapted to receive the electronic mail data;

a transmission mail error determination unit adapted to analyze the electronic mail data received by said reception unit and to determine whether or not the electronic mail data is error notification mail data for notifying a user of a transmission error of the electronic mail data transmitted by said transmission unit; and a control unit adapted to, when said transmission mail error determination unit determines that the received electronic mail data is error notification mail data, control to inhibit transfer or storage of the received electronic mail data.

10. The apparatus according to claim 9, further comprising:

a printing unit capable of printing the electronic mail data received by said reception unit; and an execution unit adapted to, in accordance with designation of a destination contained in the electronic mail data received by said reception unit, execute at least one of transfer of the electronic mail data to the destination and storage of the electronic mail data in a predetermined memory;

wherein the control unit causes said printing unit to process the received electronic mail data, when said reception mail error determination unit determines that the received electronic mail data contains the data which cannot be handled.

11. The apparatus according to claim 9, wherein said transmission mail error determination unit analyzes MIME information of the received electronic mail data and determines that the electronic mail data is error notification mail data when Content-Type in the MIME information is multipart/report.

12. A communication method comprising:

a reception step of receiving electronic mail data;

a determination step of determining whether or not the electronic mail data received in the reception step contains data which cannot be handled by a communication apparatus;

a step of inhibiting transfer or storage of the received electronic mail data when it is determined in the determination step that the received electronic mail data contains data which cannot be handled;

a step of, in accordance with designation of a destination contained in the electronic mail data received in the reception step, executing at least one of transfer of the electronic mail data to the destination and storage of the electronic mail data in a predetermined memory; and a printing step of printing, of the received electronic mail data, only data which can be handled by the communication apparatus is printed, when it is determined in the determination step that the received electronic mail data contains data which cannot be handled.

13. The method according to claim 12, wherein, in the determination step, it is determined for each attached file whether or not the received electronic mail data contains data which cannot be handled.

14. The method according to claim 12, wherein, in the determination step, it can be determined for each page of the attached file whether or not the received electronic mail data contains data which cannot be handled.

15. The method according to claim 12, wherein, in the determination step, the received electronic mail data is analyzed, and it is determined that the received electronic mail data contains data which cannot be handled by the communication apparatus when the analysis indicates at least one of a case wherein a MIME analysis processing error is indicated, a case wherein the electronic mail data contains undecodable data, a case wherein more than a predetermined percentage of the electronic mail data cannot be decoded, and a case wherein the electronic mail data contains data in a data format which cannot be handled by the communication method.

16. A communication method comprising:
    a reception step of receiving electronic mail data;
    a determination step of determining whether or not the electronic mail data received in the reception step contains data which cannot be handled by a communication apparatus;
    a step of inhibiting transfer or storage of the received electronic mail data when it is determined in the determination step that the received electronic mail data contains data which cannot be handled;
    a transmission step of transmitting the electronic mail data; and
    a transmission mail error determination step of analyzing the electronic mail data received in the reception step and determining whether or not the electronic mail data is error notification mail data for notifying a user of a transmission error of the electronic mail data transmitted in the transmission step,
    wherein, in the control step, control is performed to inhibit transfer or storage of the received electronic mail data, when it is determined in the transmission mail error determination step that the received electronic mail data is the error notification mail data.

17. The method according to claim 16, wherein, in the transmission mail error determination step, MIME information of the received electronic mail data is analyzed, and it is determined that the electronic mail data is the error notification mail data when Content-Type in the MIME information is multipart/report.

18. A communication method comprising:
    a transmission step of transmitting electronic mail data;
    a reception step of receiving the electronic mail data;
    a transfer/storage step of, in accordance with designation of a destination contained in the electronic mail data received in the reception step, executing at least one of transfer of the electronic mail data to the destination and storage of the electronic mail data in a predetermined memory;
    a transmission mail error determination step of analyzing the electronic mail data received in the reception step and determining whether or not the electronic mail data is error notification mail data for notifying a user of a transmission error of the electronic mail data transmitted in the transmission step;
    a step of inhibiting transfer or storage of the received electronic mail data in the transfer/storage step when it is determined in the transmission mail error determination step that the received electronic mail data is the error notification mail data; and
    a printing step of printing the received electronic mail data when it is determined in the transmission mail error determination step that the received electronic mail data is the error notification mail data.

19. The method according to claim 18, wherein, in the transmission mail error determination step, MIME information of the received electronic mail data is analyzed, and it is determined that the electronic mail data is the error notification mail data when Content-Type in the MIME information is multipart/report.

20. A storage medium which stores a computer-implemented program used for a control method for a communication apparatus, the program comprising:
    codes of the reception step of receiving electronic mail data;
    codes of the reception mail error determination step of determining whether or not the electronic mail data received by the code of the reception step contains data which cannot be handled by the communication apparatus;
    codes of the step of inhibiting transfer or storage of the received electronic mail data when it is determined by the code of the reception mail error determination step that the received electronic mail data contains data which cannot be handled;
    codes of the step of, in accordance with designation of a destination contained in the electronic mail data received in the reception step, executing at least one of transfer of the electronic mail data to the destination and storage of the electronic mail data in a predetermined memory; and
    codes of the step of printing, of the received electronic mail data, only data which can be handled by the communication apparatus is printed, when it is determined in the determination step that the received electronic mail data contains data which cannot be handled.

21. A storage medium which stores a computer-implemented program used for a control method for a communication apparatus, the program comprising:
    codes of the reception step of receiving electronic mail data;
    codes of the step of determining whether or not the electronic mail data received in the reception step contains data which cannot be handled by a communication apparatus;
    codes of the step of inhibiting transfer or storage of the received electronic mail data when it is determined in the determination step that the received electronic mail data contains data which cannot be handled;
    codes of the transmission step of transmitting the electronic mail data, and
    codes of the transmission mail error determination step of analyzing the electronic mail data received in the reception step and determining whether or not the electronic mail data is error notification mail data for notifying a user of a transmission error of the electronic mail data transmitted in the transmission step,
    wherein, in the control step, control is performed to inhibit transfer or storage of the received electronic mail data, when it is determined in the transmission mail error determination step that the received electronic mail data is the error notification mail data.

* * * * *